(12) United States Patent  
Sugita

(10) Patent No.: US 10,514,078 B2  
(45) Date of Patent: Dec. 24, 2019

(54) VIBRATION CONTROL PAD

(71) Applicant: ANSHIN CO., LTD., Aichi (JP)

(72) Inventor: Kikuo Sugita, Aichi (JP)

(73) Assignee: ANSHIN CO., LTD., Aichi (JP)

( * ) Notice: Subject to any disclaimer, the term of this patent is extended or adjusted under 35 U.S.C. 154(b) by 0 days.

(21) Appl. No.: 15/786,088

(22) Filed: Oct. 17, 2017

(65) Prior Publication Data

US 2018/0135725 A1  May 17, 2018

(30) Foreign Application Priority Data

Oct. 24, 2016 (JP) .................................. 2016-207574

(51) Int. Cl.
| | |
|---|---|
| F16F 5/00 | (2006.01) |
| F16F 15/04 | (2006.01) |
| E04B 1/98 | (2006.01) |
| E04H 9/02 | (2006.01) |
| F16F 7/10 | (2006.01) |
| F16F 15/02 | (2006.01) |
| F16F 1/371 | (2006.01) |
| F16F 1/373 | (2006.01) |

(52) U.S. Cl.
CPC .............. *F16F 15/04* (2013.01); *E04B 1/985* (2013.01); *E04H 9/027* (2013.01); *F16F 1/371* (2013.01); *F16F 1/3737* (2013.01); *F16F 7/1005* (2013.01); *F16F 15/022* (2013.01); *E04H 2009/026* (2013.01)

(58) Field of Classification Search
CPC ............. B32B 15/04; B32B 15/08; F16F 9/30

USPC .................. 188/73.37, 250 B, 251 A; 52/167.1–167.7; 267/136, 152, 153; 248/632–638

See application file for complete search history.

(56) References Cited

U.S. PATENT DOCUMENTS

| | | | | |
|---|---|---|---|---|
| 4,338,758 A | * | 7/1982 | Hagbjer | F16F 9/30 188/268 |
| 4,482,592 A | * | 11/1984 | Kramer | E04B 1/98 428/172 |
| 4,778,028 A | * | 10/1988 | Staley | F16F 7/108 181/208 |
| 4,887,788 A | * | 12/1989 | Fischer | E01D 19/041 248/562 |
| 5,351,940 A | * | 10/1994 | Yano | F16D 65/0006 267/153 |
| 5,407,034 A | * | 4/1995 | Vydra | B32B 15/08 188/73.37 |

(Continued)

FOREIGN PATENT DOCUMENTS

JP 2015-072062 A 4/2015

*Primary Examiner* — Christopher P Schwartz  
(74) *Attorney, Agent, or Firm* — Nelson Mullins Riley & Scarborough LLP; Anthony A. Laurentano

(57) ABSTRACT

A vibration control pad (5) comprises a gel elastic body (7) made of an elastic-viscous material and heavy-object support members (8) embedded in the gel elastic body (7). A protrusion (11) is formed only on either the top or bottom surface of the gel elastic body (7) or formed on each of the top and bottom surfaces of the gel elastic body (7) in such a manner as to cover part of the support bodies (8). The protrusion (11) securely contains the support bodies (8) in the gel elastic body (7) to prevent the support bodies (8) from being detached or separated from the gel elastic body (7) when the vibration control pad (5) is taken out of its packaging member for use.

4 Claims, 9 Drawing Sheets

(56) References Cited

U.S. PATENT DOCUMENTS

| | | | | |
|---|---|---|---|---|
| 5,695,867 A | * | 12/1997 | Saitoh | B32B 15/04 428/219 |
| 5,712,038 A | * | 1/1998 | Yamazaki | B32B 25/10 428/411.1 |
| 5,766,720 A | * | 6/1998 | Yamagishi | F16F 1/37 428/119 |
| 5,939,179 A | * | 8/1999 | Yano | B32B 15/08 428/212 |
| 2013/0000226 A1 | * | 1/2013 | Sugita | E04H 9/021 52/167.7 |

* cited by examiner

VIBRATION CONTROL PAD

FIELD OF THE INVENTION

The present invention relates to a vibration control pad that includes a gel elastic body for absorbing the vibrational energy of a heavy object.

BACKGROUND

One commonly used simple method for preventing a heavy object from toppling over due to vibrations, for example, from a giant earthquake is to secure the heavy object to the ground with anchor bolts. However, as this method requires drilling or otherwise making holes in the supporting surface to secure the heavy object, this method cannot be easily used to install processing lines at food processing plants, which need periodic cleaning for maintaining hygienic conditions, or at plants where large pieces of equipment need to be moved frequently.

As a means to solve such a problem, Japanese Published Unexamined Patent Application No. 2015-72062 proposes vibration control pads using gel elastic bodies and a method for seismic isolation. As shown in FIG. 7A, according to this publication, a vibration control pad 50 and a pressurizing plate 60 are interposed between each leg portion 30 of a heavy object, such as equipment 1, and a floor surface F. As shown in FIG. 7B, the vibration control pad 50 includes a gel elastic body 70 made, for example, of silicon rubber having elastic viscosity that absorbs the vibration of the equipment 1 and a support body 80 made, for example, of high-damping rubber that bears or supports the load of the equipment 1. Once the vibration control pads 50 are installed, the support bodies 80 bear and support the load of the equipment 1 so that the gel elastic bodies 70 are prevented from being crushed during normal use while the gel elastic bodies 70 are adapted to absorb vibration due to its elastic viscosity during vibration. This method allows for the fixing of a heavy object on a supporting surface without making holes in the supporting surface.

SUMMARY OF THE INVENTION

Problem to be Solved by the Invention

When manufacturing a vibration control pad of this type (such as the vibration control pad 50 described above), as shown in FIG. 8A, a support body 80 is set in advance in a tray 100 designed for manufacturing a vibration control pad and then a liquid elastic-viscous material is cast into the tray 100 to form a gel elastic body 70. As the gel elastic body 70 remains sticky due to its elastic viscosity, after the casting step, the vibration control pad 50 is left in the tray 100 without being removed, so that a worker can take the vibration control pad 50 out of the tray 100 at the site of antiseismic construction work.

As can be seen from the above-described manufacturing process, as an elastic-viscous material is poured or cast into the tray 100 with the support body 80 in contact with one side of the tray 100, that one side of the support body 80 is exposed from the gel elastic body 70 after the elastic body 70 is molded. If a worker tries to pull on the gel elastic body 70 to peel the elastic body 70 out of the tray 100, the gel elastic body 70 is bent to a curve as shown in FIG. 8B. Then, the support body 80, being made of a harder material than the elastic-viscous material of the body 70, may slip out of the gel elastic body 70 and be detached or separated from the vibration control pad 50. Once the support body 80 is detached or separated from a vibration control pad 50, it will no longer be able to serve its purpose, thus requiring a replacement vibration control pad.

Additionally, to protect the gel elastic body 70 of the vibration control pad 50 from being crushed by the load of a heavy object, the hardness and the amount of the support body 80 needs to be properly adjusted. For example, as shown in FIG. 9, a plurality of support bodies 80 may be provided, such as in a double concentric pattern with one surround by the other. One problem of this solution is that the support bodies 80, which are harder than the gel elastic body 70 and have a larger area of contact with the tray 100, can easily be separated from the vibration control pad 50.

In the light of the above, one important object of the present invention is to provide a vibration control pad that comprises a gel elastic body for absorbing vibration and one or more support bodies for supporting a heavy object, wherein the one or more support bodies does not come detached or separated from the gel elastic body as the vibration control pad is removed from the package for use.

Means to Solve the Problem

In order to solve the above-identified problem, the invention provides the following vibration control pad:

(1) The vibration control pad comprises: a gel elastic body made of an elastic-viscous material; one or more heavy-object support bodies embedded in the gel elastic body; one or more protrusions formed on either one or both of top and bottom surfaces of the gel elastic body in such a manner as to cover part of the one or more support bodies.

(2) In another aspect of the foregoing vibration control pad, the one or more support bodies comprise a plurality of cores made of a material harder than the gel elastic body, and wherein the one or more protrusions are formed to span the plurality of cores.

(3) In yet another aspect of the foregoing vibration control pad, one or more recesses are formed around the circumferences of the one or more support bodies in the same side of the gel elastic body as the one or more protrusions.

(4) In still another aspect, the foregoing vibration control pad further comprises a packaging member for packaging the gel elastic body, wherein the packaging member has a cavity provided therein for forming the gel elastic body from the elastic-viscous material and the packaging member has one or more portions formed therein for forming the one or more protrusions.

Effect of the Invention

In the vibration control pad according to the present invention, one or more protrusions are formed only on either the top or bottom surface of the gel elastic body or formed on both of the top and bottom surfaces of the gel elastic body in such a manner as to cover part of the one or more support bodies. Accordingly, the one or more protrusions can securely contain the one or more support bodies in the gel elastic body to prevent the one or more support bodies from coming off or dislodging from the gel elastic body when the vibration control pad is taken out of its packaging member.

DETAILED DESCRIPTION OF PREFERRED EMBODIMENTS

Figure 1:
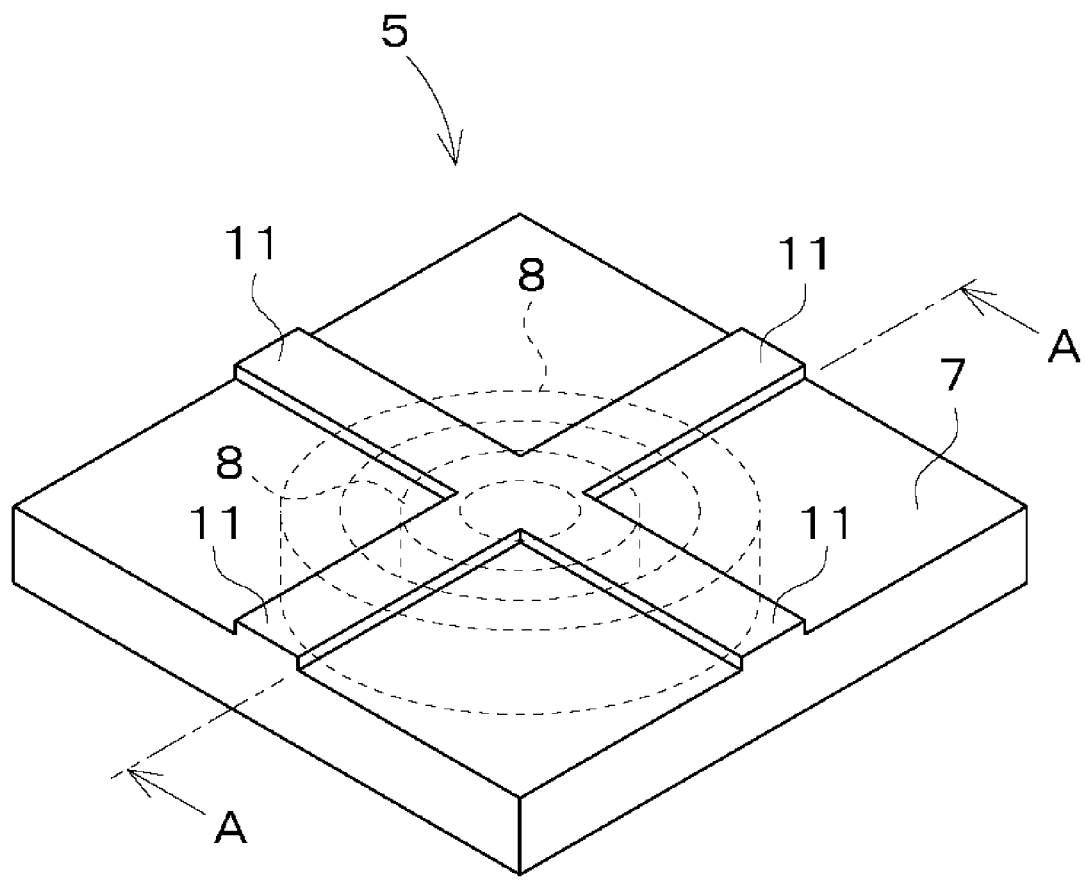
FIG. 1 is a perspective view of a vibration control pad according to the present invention.

Preferred embodiments of the present invention will be described hereinafter with reference to the attached drawings. FIG. 1 shows a vibration control pad 5 according to the present invention. The vibration control pad 5 comprises a gel elastic body 7 made of an elastic-viscous material, such as silicon rubber, that absorbs the vibration of a machine, a piece of equipment or facilities (not shown) and support bodies 8 made for example of a material, such as high-damping rubber, that is harder than the gel elastic body 7 that bears or supports the load of the equipment when in use. The support bodies 8 are formed with a smaller thickness that the gel elastic body 7 and is embedded in the gel elastic body 7. The gel elastic body 7 has a protrusion 11 formed partially thereon to partially cover the support bodies 8. The height of the protrusion 11 is about 6%-100% of the thickness of the vibration control pad 5. For example, if the vibration control pad 5 has a thickness of about 5 mm, the protrusion 11 will have a height of about 0.3-5 mm.

The number of support bodies 8 may vary depending on the size and the weight of equipment 1 supported by the vibration control pad 5, so that there may be a single or multiple support bodies 8 to suit the specific application. Those shown in FIGS. 1-3 each have two circular cores (an inner support body 8 and an outer support body 8) and the protrusion 11 is formed to span these support bodies 8.

Figure 2A:
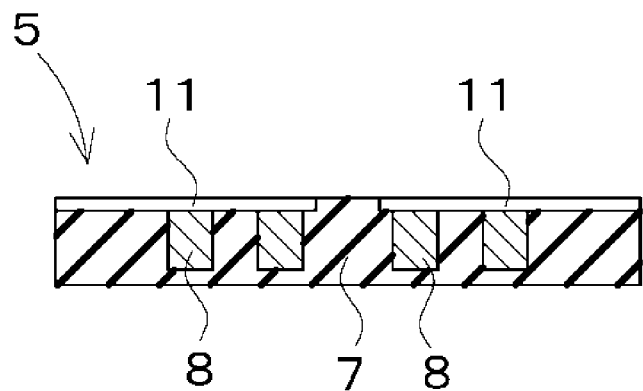
FIGS. 2A and 2B show cross-sectional views of different embodiments of the vibration control pad taken on line A-A in FIG. 1.
Figure 2B:
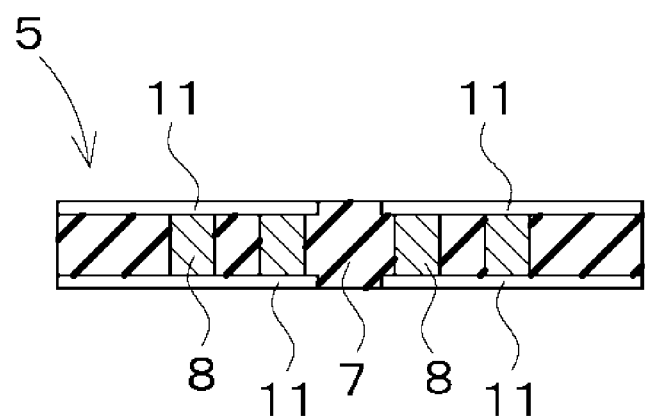

FIGS. 2A and 2B are cross-sectional views of vibration control pads 5 according to the present invention. A protrusion 11 may be formed only on either the top or bottom surface of the gel elastic body 7 as shown in FIG. 2A or formed on each of the top and bottom surfaces of the gel elastic body 7 as shown in FIG. 2B to cover part of the support bodies 8.

Figure 3A:
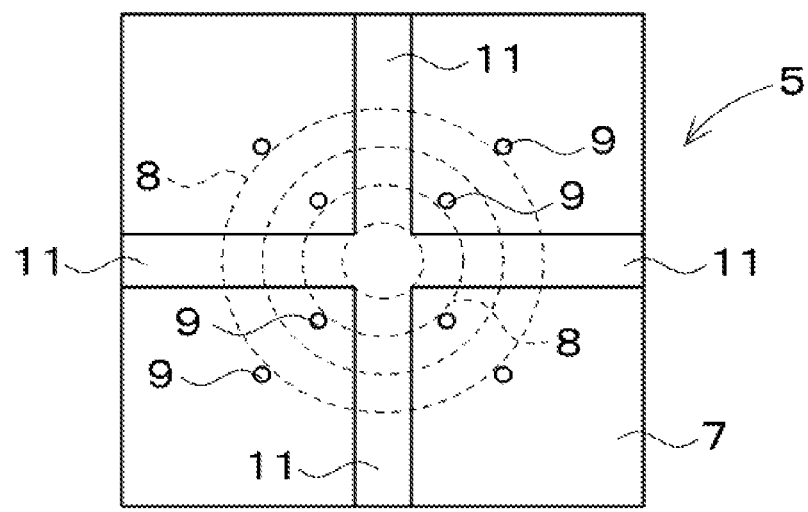
FIGS. 3A, 3B, and 3C show plan views of different embodiments of the vibration control pads according to the present invention.
Figure 3B:
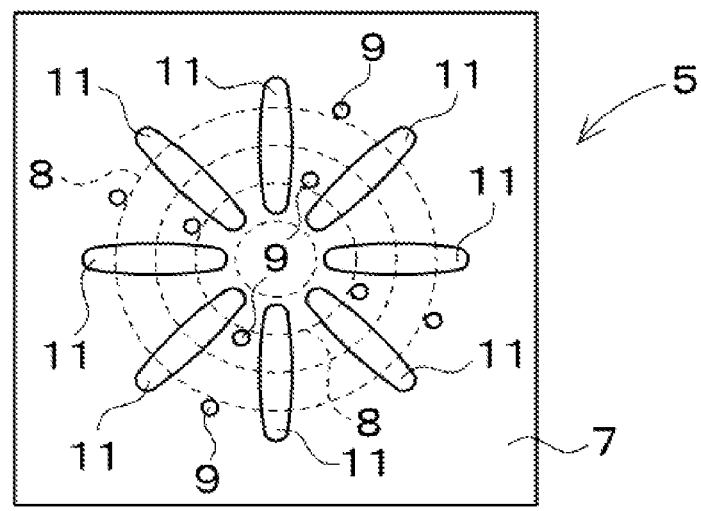
Figure 3C:
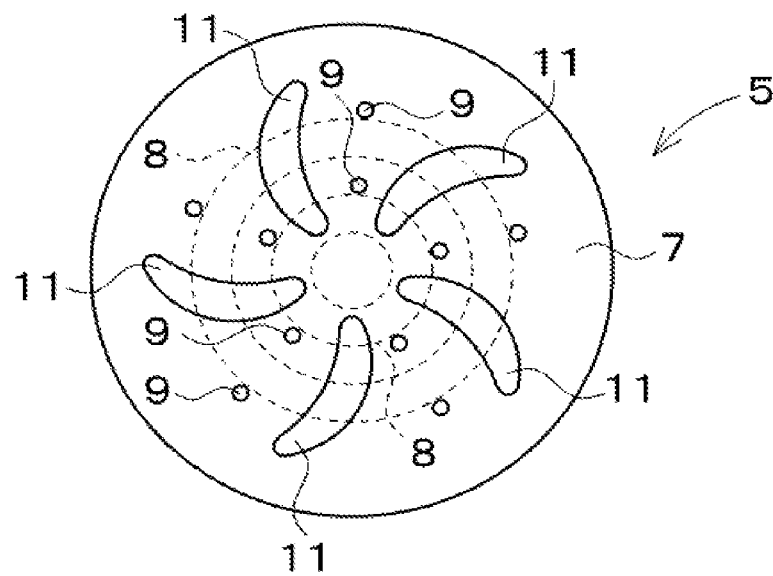

FIGS. 3A, 3B and 3C are plan views of vibration control pads 5 according to the present invention. Although the protrusion 11 of the vibration control pad 5 shown in FIG. 3A is formed in a cross shape, the present invention is not so limited. In particular, the protrusion 11 may be formed in any shape and/or any number of such protrusions may be formed as long as the protrusion(s) may be formed to cover part of the support bodies 8 and to span the support bodies 8. For example, as for the designability, a plurality of protrusions 11 may be formed in a radial pattern as shown in FIG. 3B, or a plurality of arcuate protrusions 11 may be arranged circumferentially as shown in FIG. 3C.

Figure 4:
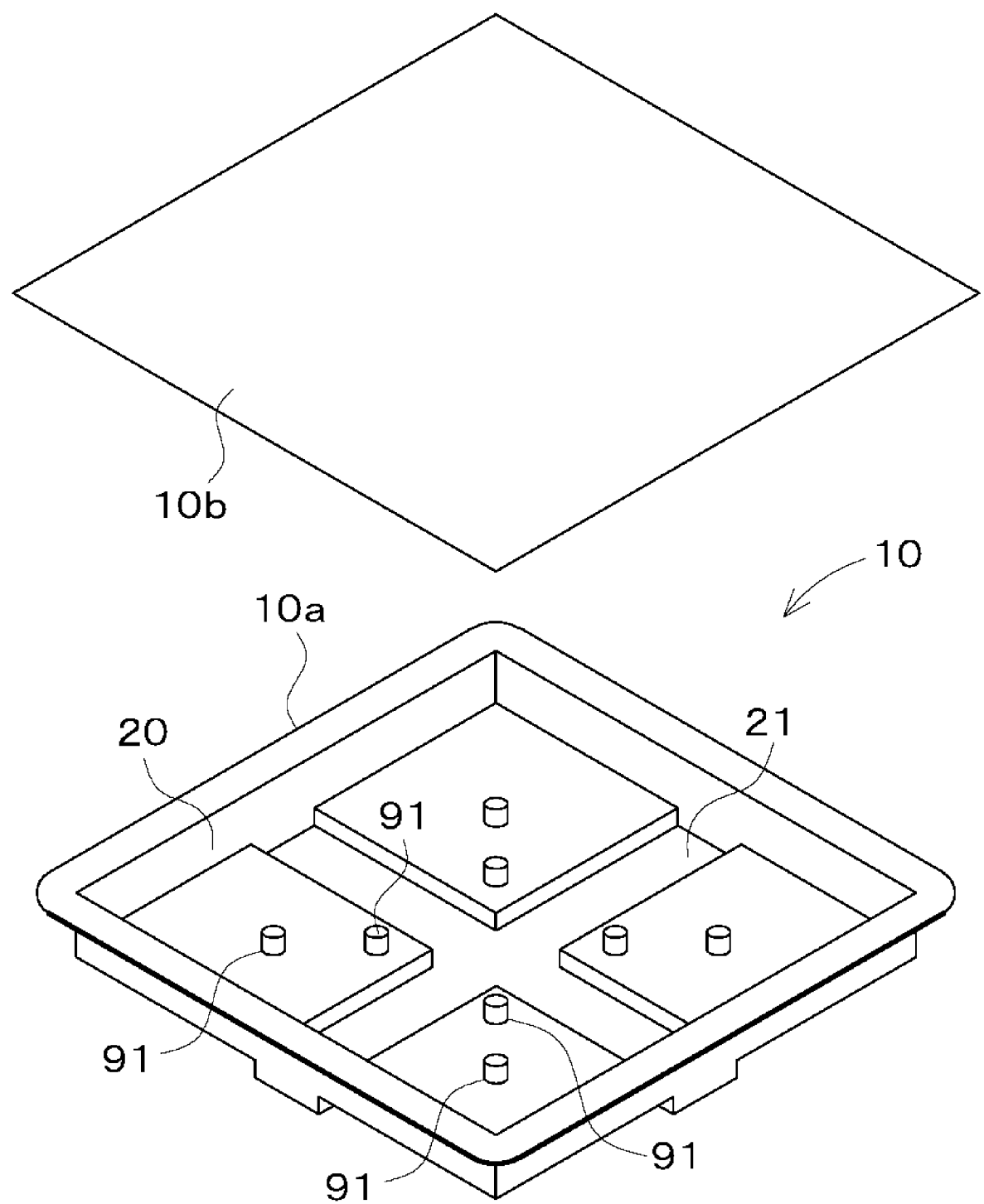
FIG. 4 is a perspective view of a packaging member for a vibration control pad according to the present invention.

FIG. 4 shows a packaging member 10 of the vibration control pad 5 that is also used to manufacture the vibration control pad 5. The packaging member 10 includes a molding portion 10a and a lid portion 10b. A cavity 20 is formed in the molding portion 10a to mold the vibration control pad 5 therein from an elastic-viscous material, and a protrusion forming portion 21 is formed in part of the cavity 20 to form the protrusion 11 in such as manner as to cover part of the support bodies 8 upon molding.

As shown in FIG. 3A, one or more recesses 9 are formed in the same side of the gel elastic body 7 as the protrusion 11 where the recesses 9 surround the circumferences of the support bodies 8. As shown in FIG. 4, these recesses 9 are formed by projections 91 on the molding portion 10a so as to position the support bodies 8 with respect to the molding portion 10a of the packaging member 10 during the manufacture of the vibration control pad 5. In this way, the vibration control pad 5 can be easily manufactured using the packaging member 10 by pouring an elastic-viscous material into the cavity 20 of the molding portion 10a with the support bodies 8 properly positioned. As these projections 91 are provided only to position the support bodies 8, it will suffice if at least three projections 91 are provided. Furthermore, the projections 91 may be formed in any suitable shape or size.

Figure 5:
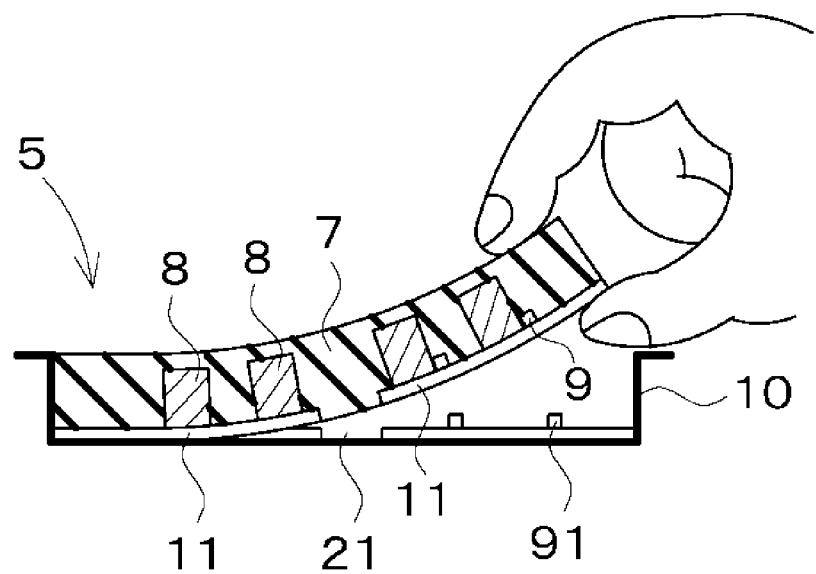
FIG. 5 is a perspective view of the vibration control pad shown in FIG. 4 as it is removed from the packaging member.

FIG. 5 is a cross-sectional view showing how a vibration control pad 5 according to the present invention is removed for use. While the vibration control pad 5 remains in the packaging member 10 or is transported in the packaging member 10, the packaging member 10 prevents the gel elastic body 7 from sticking to other objects. When the vibration control pad 5 is used, the vibration control pad 5 is peeled and removed from the packaging member 10. At this time, as the support bodies 8, which are contained in the gel elastic body 7, are kept in the elastic-viscous material by the protrusion 11, the vibration control pad 5 can be taken out of the packing member 10 without causing the support bodies 8 to be detached or separated from the gel elastic body 7.

Figure 6:
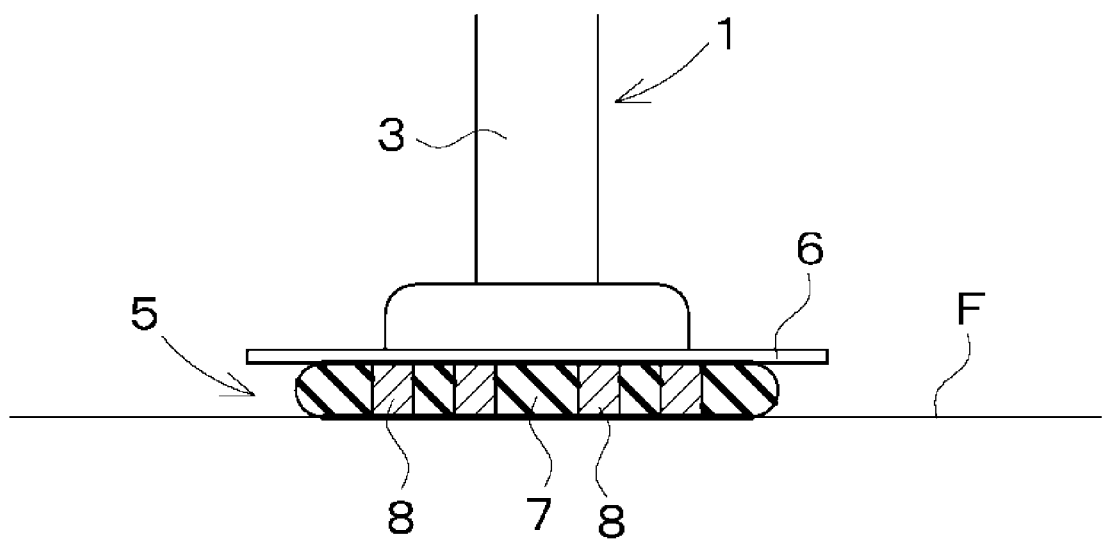
FIG. 6 is an explanatory view illustrating a method of seismic isolation using the vibration control pad shown in FIG. 5.
Figure 7A:
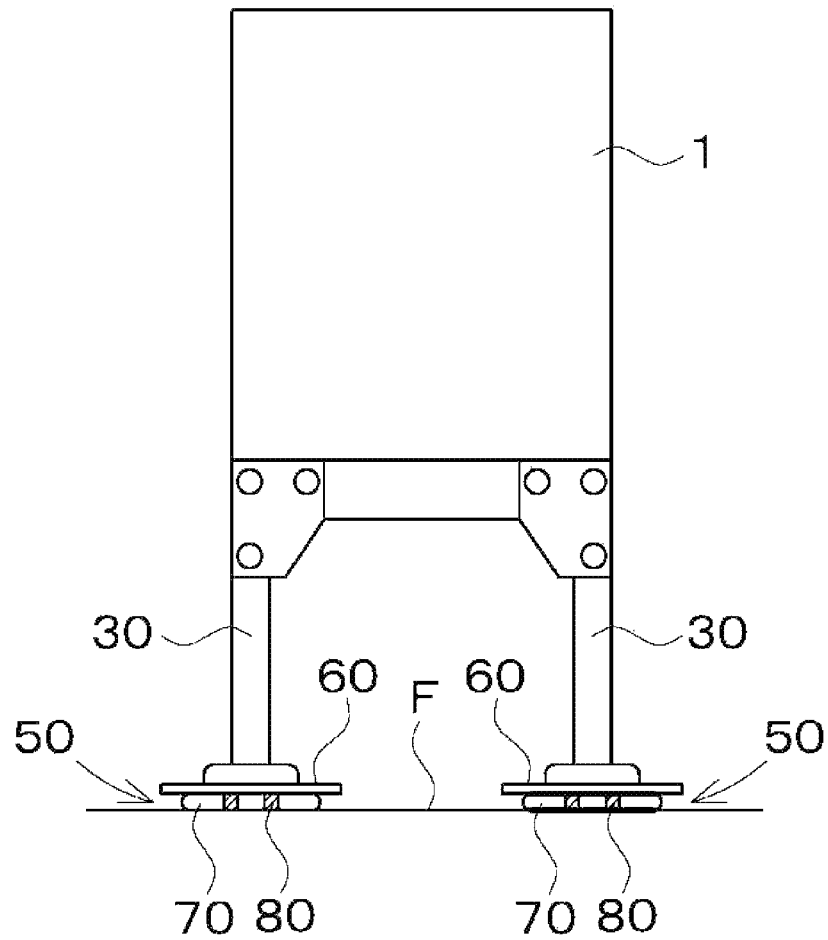
FIGS. 7A and 7B show an explanatory view illustrating a conventional vibration control pad and a conventional method of seismic isolation using the vibration control pad.
Figure 7B:
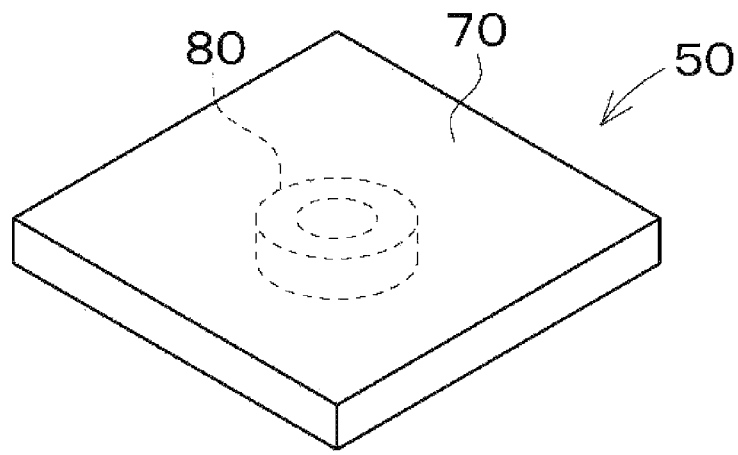
Figure 8A:
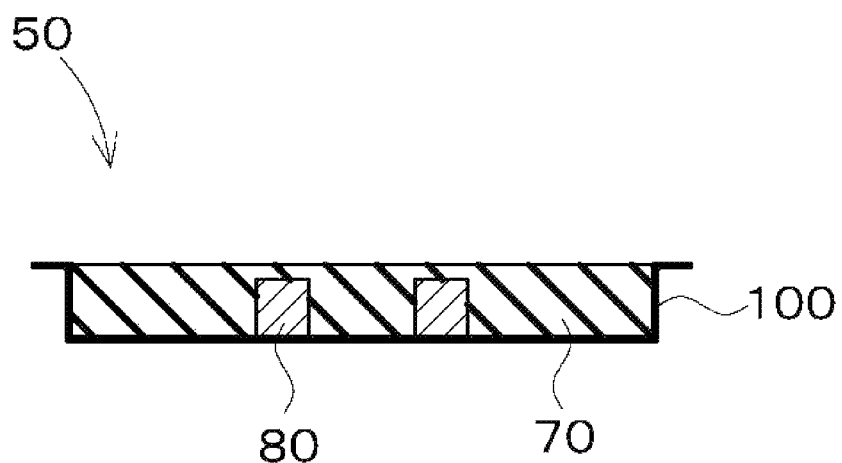
FIGS. 8A and 8B are explanatory views illustrating the conventional vibration control pad shown in FIG. 7 and how the conventional vibration control pad is contained in its packaging member.
Figure 8B:
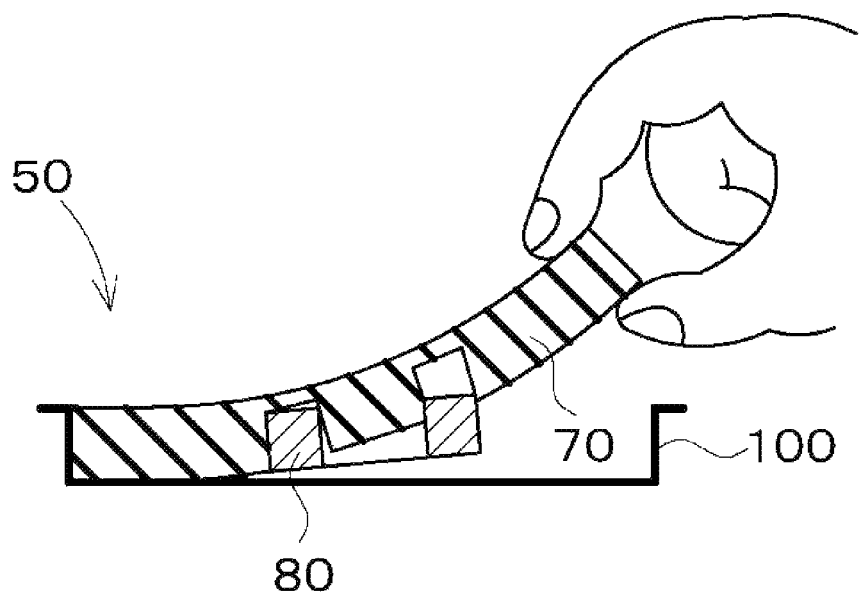
Figure 9:
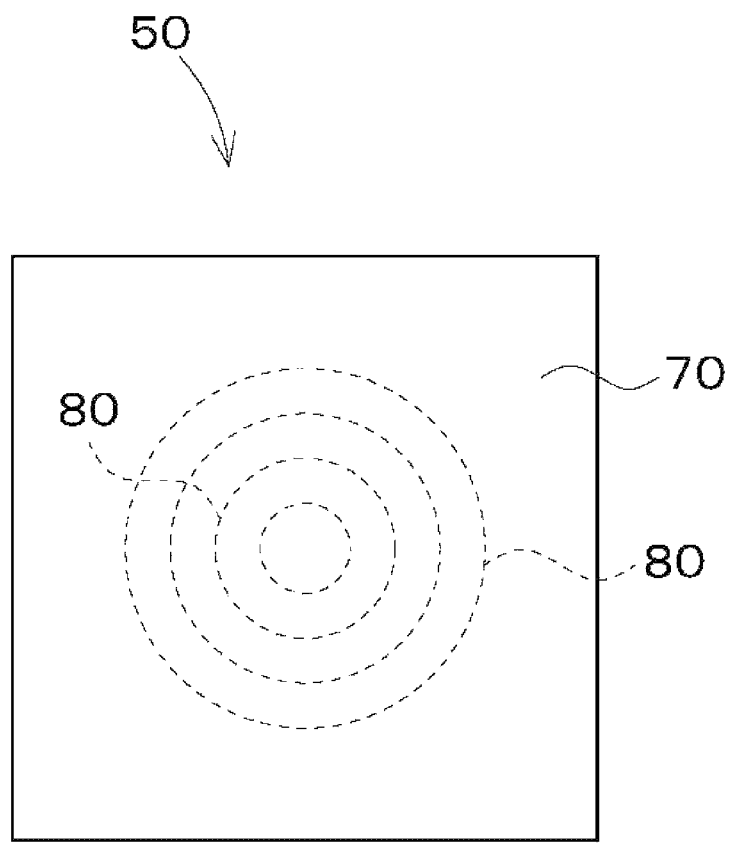
FIG. 9 is a plan view of an exemplary vibration control pad that has a plurality of support bodies provided therein.

As shown in FIG. 6, once taken out of the packaging member 10, the vibration control pad 5, together with a pressurizing plate 6, can be interposed between a leg portion 3 of equipment 1 and a floor surface F. When the vibration control pad 5 is installed in this manner, the protrusion 11 of the gel elastic body 7 is compressed by the load of the equipment 1 via the pressurizing plate 6. However, the support bodies 8 bear the load of the equipment 1 to support and prevent the vibration control pad 5 from being crushed during normal use. In addition, the gel elastic body 7 serves to absorb vibration due to its elastic viscosity if vibration occurs. This allows the equipment 1 to be installed in an aseismic manner without affecting the vibration control performance.

The present invention is not limited to the foregoing embodiments and can still be carried out with various modifications and alterations as required, in a manner still in keeping with the scope of the present invention.

What is claimed is:

1. A vibration control pad, comprising:
   a gel elastic body made of an elastic-viscous material;
   one or more heavy-object support bodies embedded in the gel elastic body;

one or more protrusions formed from the same material as the gel elastic body and formed on either one or both of top and bottom surfaces of the gel elastic body in such a manner as to cover part of the one or more support bodies so as to retain the one or more support bodies within the gel elastic body; and a packaging member for packaging the gel elastic body, wherein the packaging member has a cavity provided therein for forming the gel elastic body from the elastic-viscous material and the packaging member has one or more portions formed therein for forming the one or more protrusions, wherein the protrusion retains the one or more support bodies within the gel elastic body when the gel elastic body is removed from the packaging member.

2. The vibration control pad according to claim 1, wherein the one or more support bodies comprise a plurality of cores made of a material harder than the gel elastic body, and wherein the one or more protrusions are formed to span the plurality of cores.

3. The vibration control pad according to claim 1, wherein one or more recesses are formed around the circumferences of the one or more support bodies in the same side of the gel elastic body as the one or more protrusions.

4. A vibration control pad, comprising:

a gel elastic body made of an elastic-viscous material;

one or more heavy-object support bodies embedded in the gel elastic body;

one or more protrusions formed on either one or both of top and bottom surfaces of the gel elastic body in such a manner as to cover part of the one or more support bodies so as to retain the one or more support bodies within the gel elastic body; and a packaging member for packaging the gel elastic body, wherein the packaging member has a cavity provided therein for forming the gel elastic body from the elastic-viscous material and the packaging member has one or more portions formed therein for forming the one or more protrusions, wherein the protrusion retains the one or more support bodies within the gel elastic body when the gel elastic body is removed from the packaging member.

\* \* \* \* \*